Nov. 12, 1929.  S. SMITH  1,735,340
MACHINE FOR MAKING EGG CASE FLATS
Filed June 8, 1927  5 Sheets-Sheet 1
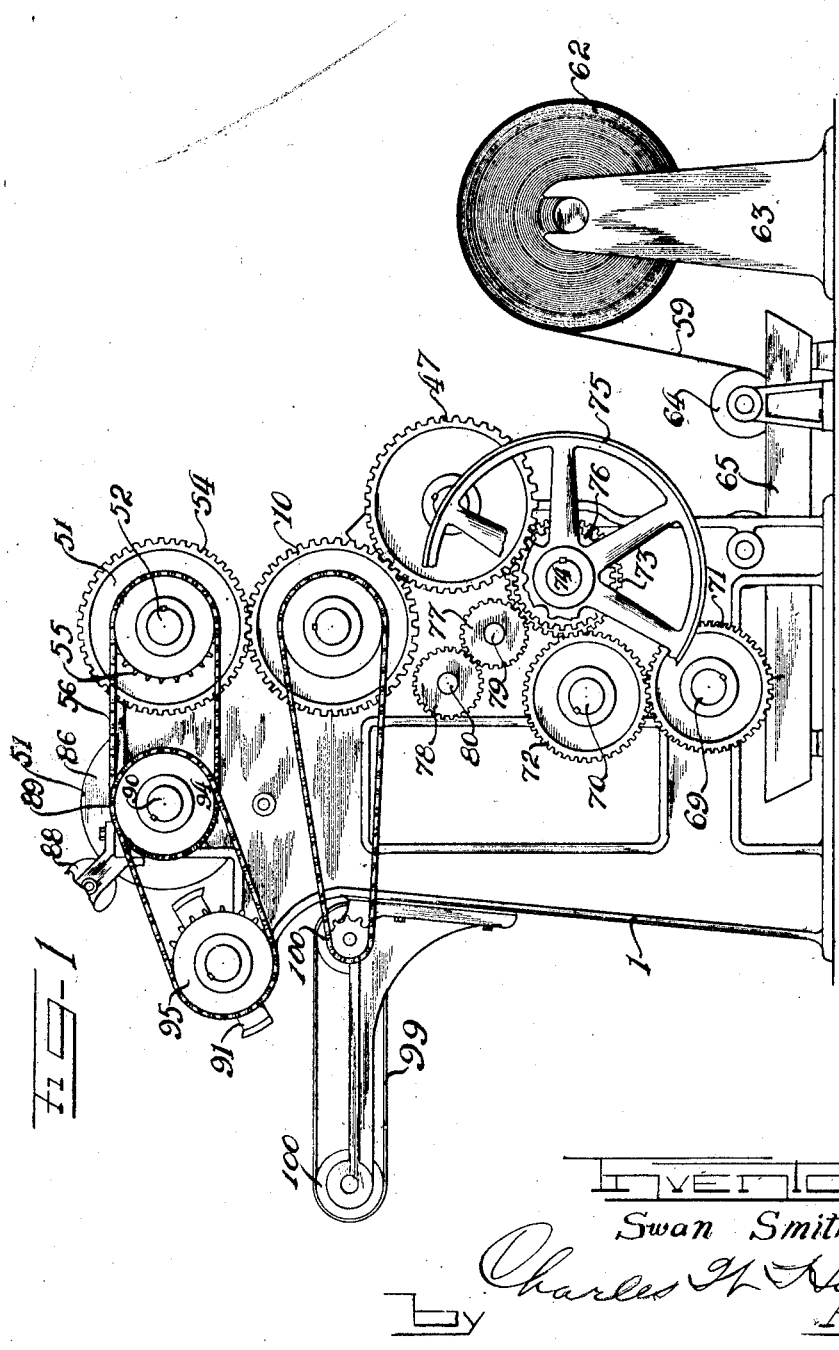
INVENTOR
Swan Smith
By Charles H. Wells
Attys

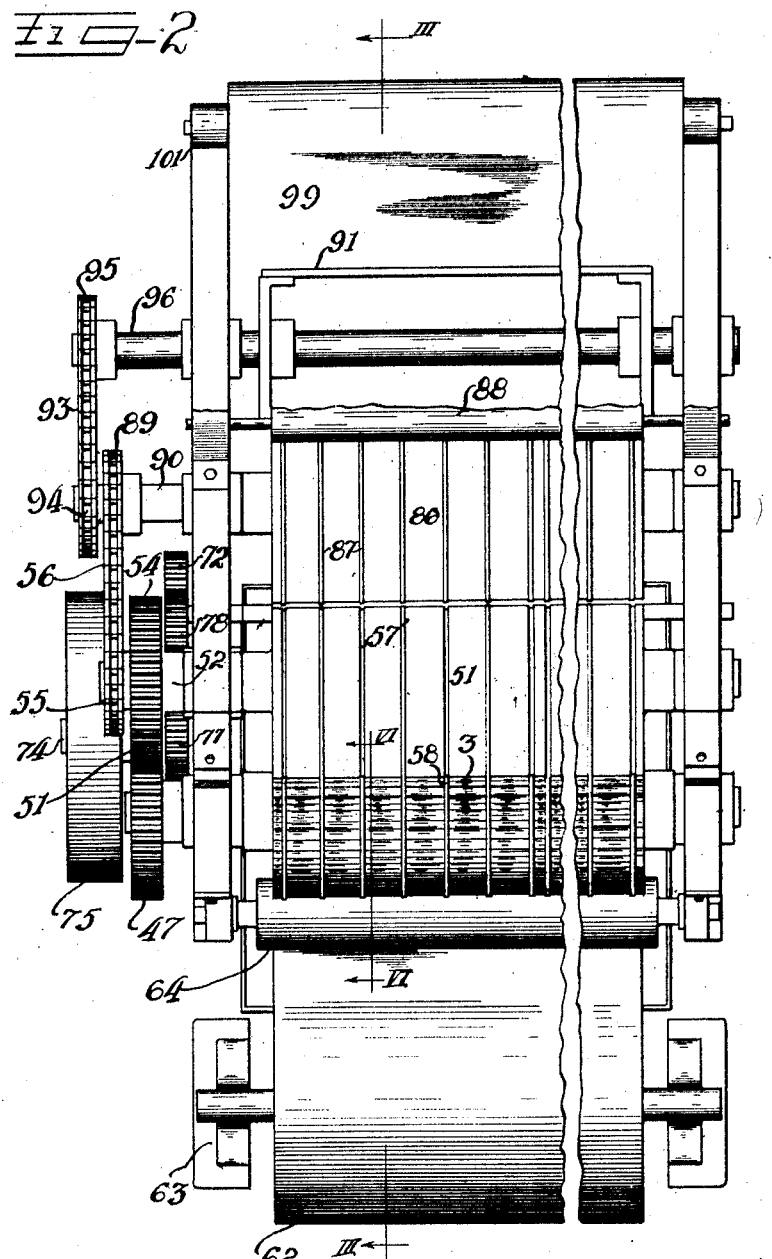

Nov. 12, 1929.        S. SMITH             1,735,340
           MACHINE FOR MAKING EGG CASE FLATS
              Filed June 8, 1927      5 Sheets-Sheet 3

Inventor
Swan Smith
By Charles W. Hill
Attys

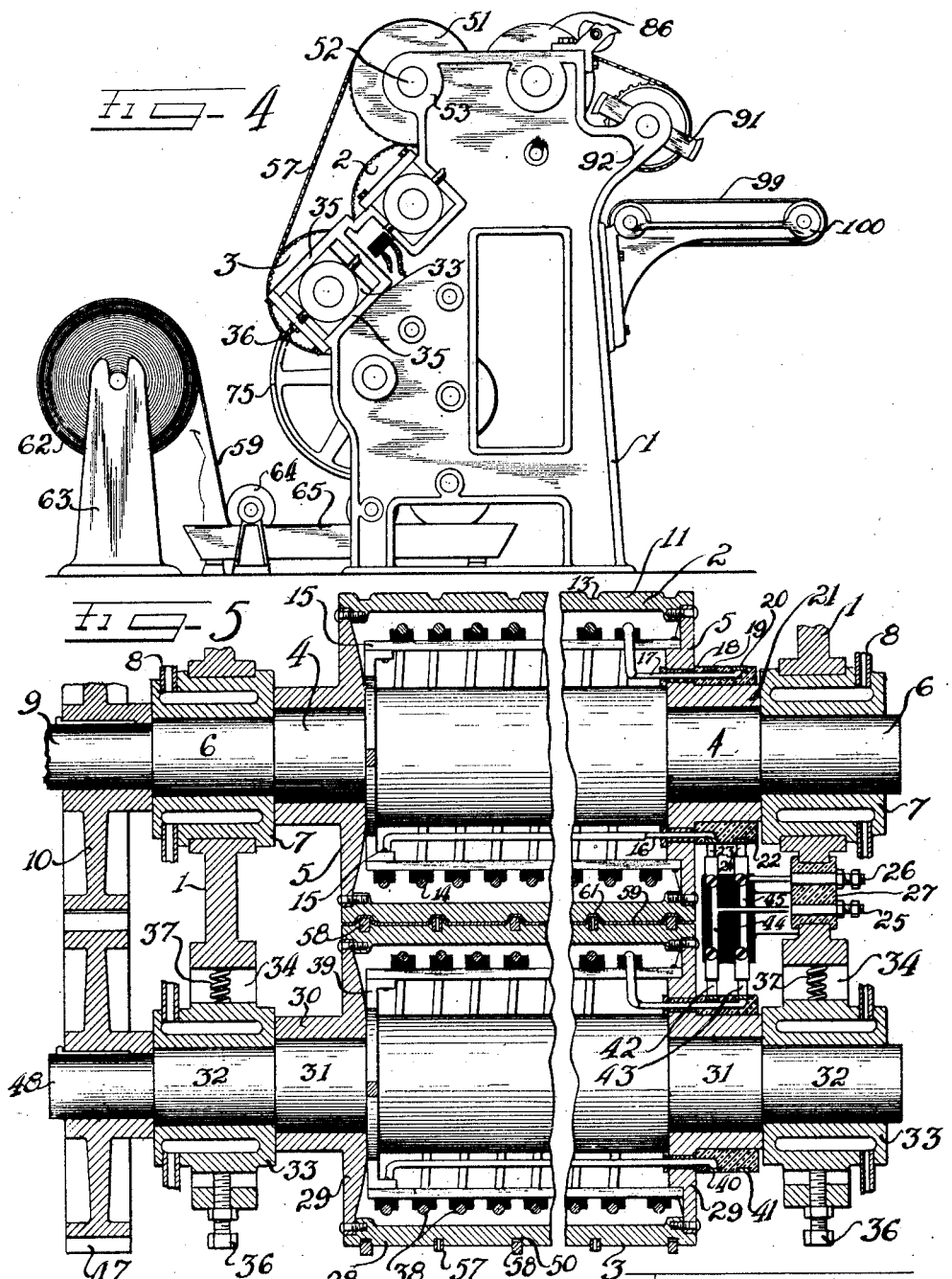

Nov. 12, 1929.  S. SMITH  1,735,340
MACHINE FOR MAKING EGG CASE FLATS
Filed June 8, 1927  5 Sheets-Sheet 5
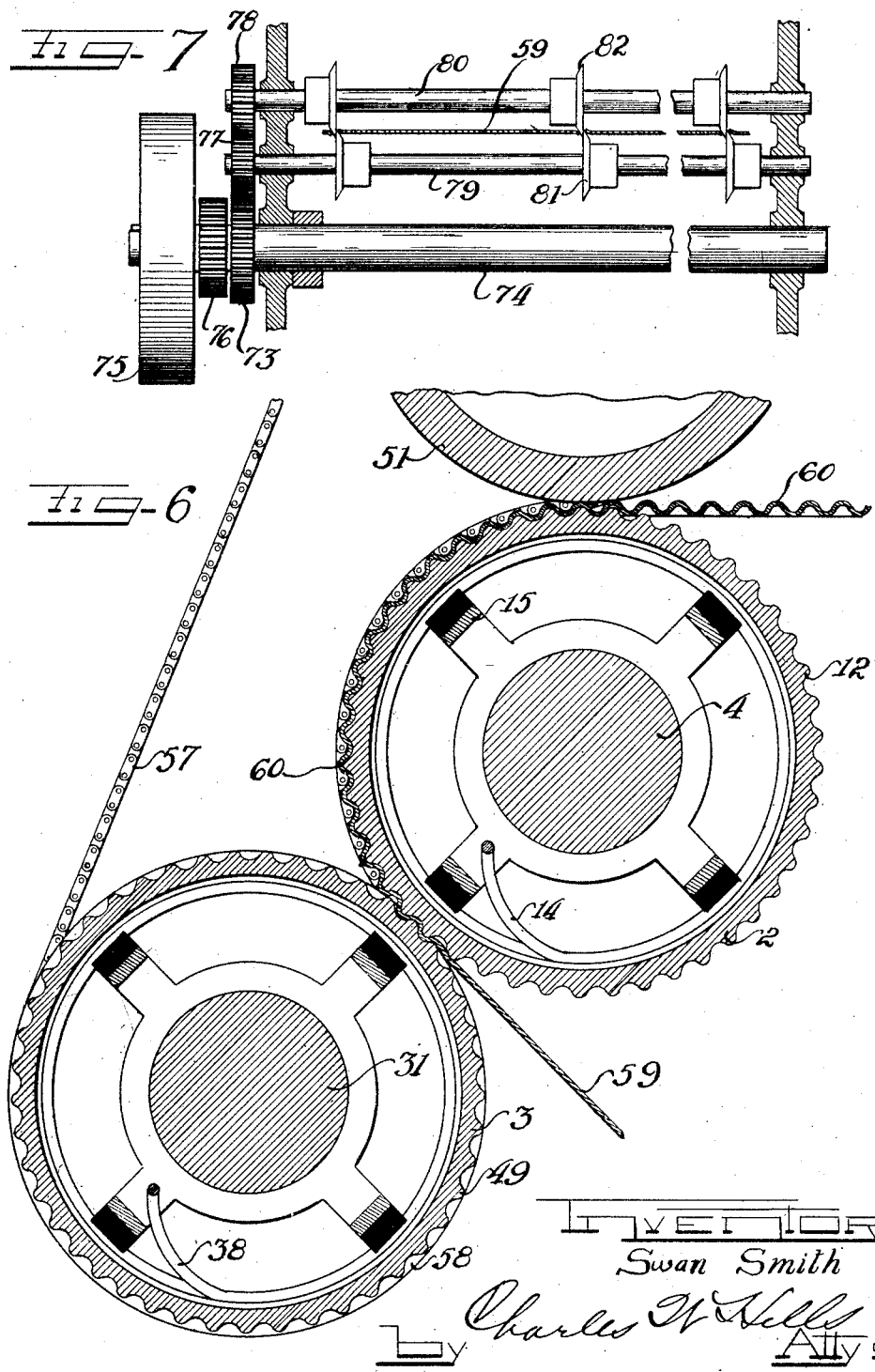

Patented Nov. 12, 1929

1,735,340

UNITED STATES PATENT OFFICE

SWAN SMITH, OF ST. PAUL, MINNESOTA

MACHINE FOR MAKING EGG CASE FLATS

Application filed June 8, 1927. Serial No. 197,275.

This invention relates to a machine for making egg case flats and more particularly for making flats of the corrugated type formed of a single sheet of relatively heavy fibre board.

It is an object of this invention to provide a machine for making corrugated egg case flats having grooves or flattened areas, transverse of the corrugations, for receiving the lower edges of the transverse partitions of the egg case fillers.

It is a further object of this invention to provide a machine for making egg case flats in a continuous operation, with means for corrugating sheet material, crushing, and cutting the same into sizes suitable for egg case flats.

It is a further object of this invention to provide in combination with the corrugating rolls of a machine for making egg case flats, means for forming grooves transverse to the corrugations and for stripping the corrugated material from the corrugating rolls.

Other and further imprtant objects of this invention will be apparent from the following description of an illustrated embodiment of my invention.

Of the drawings:

Figure 1 is a side elevational view of a machine embodying the principles of this invention and showing the driving mechanism.

Figure 2 is a broken top plan view of the same.

Figure 3 is a sectional view taken substantially on line III—III of Figure 2, with parts omitted.

Figure 4 is a side elevational view.

Figure 5 is an enlarged broken sectional view taken substantially on line V—V of Figure 3.

Figure 6 is an enlarged fragmentary sectional view taken substantially on line VI—VI of Figure 2 with parts omitted.

Figure 7 is an enlarged broken sectional view taken on line VII—VII of Figure 3, with parts in elevation.

As shown on the drawings:

The reference numeral 1 indicates as a whole the frame of a machine for making corrugated egg case flats, embodying the principles of my invention. In the side members of the frame 1 there are journalled a number of rolls, including a rigid corrugating roll 2 and an adjustably mounted corrugating roll 3, adapted to bear against and mesh with the corrugating roll 2. The stationary corrugating roll 2 is provided with a shaft 4 (Fig. 5), extending through the heads 5 of said roll to provide reduced journals 6, adapted to be rotatably mounted in bearings 7. Said bearings 7 are preferably of the water-cooled type and provided with water inlet and outlet pipes 8. Said bearings 7 are supported directly from the side members of the frame 1. At the rear side of the machine, the journal 6 is further extended to provide a reduced end 9 on which is splined a gear 10.

The corrugating roll 2 comprises a cylindrical shell 11, bolted or otherwise secured to the heads 5 and provided with an outer longitudinally corrugated surface 12. In addition to the longitudinal corrugations of the surface 12, there are also formed transverse peripheral grooves 13, (Fig. 5), suitably spaced for a purpose that will later appear. Electrical means are provided for heating the roll 2 comprising helically mounted resistance wires 14 carried upon a frame 15 within said hollow roll 2 and connected by wires 16 and 17 leading through suitable insulation 18 in one of the heads 5 to spaced contact rings 19 and 20. Said contact rings 19 and 20 are mounted upon the hub 21 of said head 5 and insulated therefrom by insulation 22. Contact brushes 23 and 24, connected with outside terminals 25 and 26, form the necessary resilient contact with the rings 19 and 20 to permit an electric current to be conducted through the resistance coils 14 from a suitable outside source of electricity when connected to said terminals 25 and 26. Said terminals 25 and 26 are suitably supported in an insulating block 27, extending through the front side wall of the frame 1.

The corrugating roll 3 is constructed very similarly to the roll 2 and comprises a cylindrical shell 28 bolted to heads 29. Said heads 29 are provided with hubs 30 through which extends a shaft 31. The reduced portions 32 of said shaft 31 are journaled in water cooled bearings 33 adjustably positioned within square or rectangular openings 34 formed in the side walls of the frame 1. The bearings 33 are preferably also square or rectangular in shape and are adapted to slide between guides 35 (Fig. 4), formed in said side walls. Said bearings 33 normally rest against bolts 36, by means of which the bearings and roll 3 are adjustable relative to the roll 2. Helical springs 37 are positioned on the opposite side of the bearings to the bolts 36 between said bearings and the ends of the guiding frames 35. Said helical springs 37 offer a certain amount of resiliency which tends to keep the corrugating rolls 2 and 3 separated against the pressure of the adjusting bolts 36.

The roll 3 is also provided with electrical resistance coils 38 mounted upon a frame 39 within said roll and connected through contact rings 40 and 41, contact brushes 42 and 43, and wires 44 and 45, to the terminal posts 25 and 26. A gear 47 is mounted upon the extended reduced end 48 of the journal 31 in meshing relation with the gear 10. The roll 3 is provided with similar corrugations 49 to the corrugations of the roll 2 and there are also formed peripheral grooves 50 in alignment with the peripheral grooves 13 of the roll 2.

A pressure roll 51 (Figures 1 to 4 inclusive), is mounted directly above the corrugating roll 2. Said roll 51 is provided with a shaft 52 journaled in bearings 53 formed in the side walls of the frame 1. The shaft 52 is provided with an extended rear end on which is mounted a gear 54 meshing with the gear 10, and a sprocket gear 55 over which is trained a chain 56. Said roll 51 is also provided with transverse peripheral grooves 57' in alignment with the grooves 13 and 50.

In certain of said transverse peripheral grooves are adapted to be trained endless solid chains 57. Said chains 57 (Fig. 6), pass around the rolls 3 and 51 and lie against substantially half of the periphery of the corrugating roll 2. Loose rings 58 are mounted in the other peripheral grooves 50 of the corrugating roll 3. Said chains 57 and rings 58 are of such dimensions as to substantially fill the grooves 50 and project from said grooves beyond the crest of the corrugations (Figures 5 and 6). Accordingly, when a web of paper 59 is threaded between the corrugating rolls 2 and 3, both transverse corrugations 60 and longitudinal corrugations 61 are formed in the paper. The longitudinal corrugations 61 are formed by the chains 57 and rings 58 pressing the paper into the corresponding peripheral grooves 13 of the corrugating roll 2. The peripheral grooves are so spaced as to provide longitudinal grooves in the finished corrugated egg case flats, properly spaced to receive the lower edges of the egg case filler sections. Crushing of the web to form the longitudinal grooves in the corrugated flats also serves to strengthen the flats and give them added rigidity.

The paper to be corrugated and to be made into flats is mounted in the form of a reel 62 upon a supporting stand 63 (Figures 1 to 4 inclusive). The end of the paper web 59 is then led beneath guiding rollers 64 through a trough 65 containing a moistening fluid 66. The web 59 then passes upwardly between driven feed rolls 67 and 68. Said feed rolls 67 and 68 are journaled in the side walls of the frame 1 and carry on the rear ends of their respective shafts 69 and 70, intermeshing gears 71 and 72 respectively.

The gear 72 is driven from a gear 73 mounted upon a main drive shaft 74 carrying a driving pulley 75. A second gear 76, also mounted upon the shaft 74, meshes with the gear 47 mounted upon the extended journal of the corrugating roll 3. The gear 73 also drives a gear 77 which in turn drives a second gear 78. Said gears 77 and 78 are mounted respectively on the shafts 79 and 80 carrying slitters 81 and 82.

The web of paper 59 passes from the feed rolls 67 and 68 through the slitters 81 and 82, (Fig. 7), where the web is slit longitudinally into the proper width for egg case flats. The web passes next to the corrugating rolls 2 and 3, where the transverse and longitudinal corrugations and grooves are impressed into the web and at the same time the web is dried to permanently set the corrugations. For this purpose, the corrugating rolls 2 and 3 are preferably heated to a relatively high temperature by means of the electrical heating means already described.

It should be noted that the chains 57 not only serve to impress longitudinal grooves into the corrugated web, but also serve to hold the web against the surface of the corrugating roll 2 until the web has passed from between said corrugating roll 2 and the upper pressure roll 51. Said chains 57 also function as stripping means to prevent the corrugated web from following on around the corrugating roll 3. The loose rings 58 merely serve to impress the longitudinal grooves in the web. The upper pressure roll 51 is adapted to bear against the corrugated web 59 and slightly crush the same to make the corrugated web more resilient and pliable.

The corrugated web after leaving the corrugating roll 2, travels over a table 83, (Fig. 3), extending between the side walls of the frame 1. Said table 83 is provided with a longitudinal slot 84 in which is mounted a small idle roll 85. A printing roll 86 is mounted directly above the roll 85 and is adapted to bear against the paper web as it passes over said roll 85. Said printing roll 86 is provided with raised printing surfaces 87, aligned with the peripheral grooves 57 of the roll 51, and adapted to extend into the longitudinal grooves 61 of the corrugated web. Said printing roll 86 is fed from a series of smaller inking rolls including a roll 88. The printing roll 86 is driven by means of the chain 56, which is trained around a sprocket gear 89 mounted upon the rear end 90 of its shaft.

The corrugated web passes from the printing roll 86 to a rotary cutter mechanism 91, (Fig. 3). Said cutter mechanism 91 is mounted upon an arm 92 from the frame 1, and is driven by means of a chain 93 trained around a sprocket gear 94 on the shaft 90 and a sprocket gear 95 on the cutter shaft 96. The rotary cutter 91 includes a pair of curved knives 97, supported upon radial arms 98, and adapted to rotate into close proximity to a bed knife 103, set in the frame 1. As the rotary cutter 91 is revolved, the blades 97 sever the web 59, the severed web dropping upon a traveling apron 99. Said apron 99 is trained over spaced rollers 100, mounted upon bracket 101 from the frame 1.

Obviously, by adjusting the speed of the rotary cutter 91, the web 59 may be severed into the correct lengths for egg case flats. These flats are delivered by the traveling apron conveyor 99, onto a table 102, where the flats are piled in suitable stacks.

I am aware that many changes may be made and numerous details of construction may be varied through a wide range without departing from the principles of this invention and I, therefore, do not purpose limiting the patent granted hereon otherwise than necessitated by the prior art.

I claim as my invention:

1. In a machine for making egg case flats, a roll having a corrugated surface and transverse peripheral grooves therein in spaced parallel planes, a second roll having a similar surface adapted to press against said first roll to form transverse corrugations in a web of paper fed between said rolls, and means separate from said rolls adapted to project into the peripheral grooves of said first roll to form longitudinal grooves in said paper web.

2. In a machine of the class described, a roll having a corrugated surface and transverse peripheral grooves therein in spaced parallel planes, a second roll having a similar surface adapted to press against said first roll, endless bands of flexible material adapted to travel in said peripheral grooves, and means for feeding fibrous web material through said rolls for the purpose of forming corrugated egg case flats, said flexible bands forming longitudinal grooves in said flats.

3. In a machine of the class described, a heated roll having a corrugated surface and transverse peripheral grooves therein in spaced parallel planes, a second heated roll having a similar surface adapted to press against said first roll and endless bands of flexible material adapted to travel in said peripheral grooves and to project beyond the corrugations of the respective rolls.

4. In a machine of the class described, a roll having a corrugated surface and transverse peripheral grooves therein in spaced parallel planes, a second roll having a similar surface adapted to press against said first roll and endless bands of flexible material adapted to travel in said peripheral grooves, said bands being substantially twice as thick as the depth of the grooves.

5. In a machine for making egg case flats, a stand for supporting a reel of fibrous material, means for moistening said material, heated corrugated drums for corrugating and drying said material and flexible endless strips passing between said drums to form spaced parallel grooves in said material transverse to said corrugations.

6. In a machine for making egg case flats, a stand for supporting a reel of fibrous material, means for moistening said material, heated corrugated drums for corrugating and drying said material, flexible endless strips passing between said drums to form spaced parallel grooves in said material transverse to said corrugations, means for slitting said material, and automatic means for cutting the same into sizes suitable for egg case flats.

7. In a machine for making egg case flats, a frame, a corrugated roll stationarily supported in said frame, a second corrugated roll adjustably positioned in said frame for bearing against said stationary roll, each of said rolls having aligned peripheral grooves lying in transverse planes to the axis of the rolls, and flexible endless members trained around said adjustable rolls in said grooves for the purpose of forming longitudinal grooves in the egg case flats.

8. In a machine for making egg case flats, a frame, a corrugated roll stationarily supported in said frame, a second corrugated roll adjustably positioned in said frame for bearing against said stationary roll, each of said rolls having aligned peripheral grooves extending to the trough of the corrugations lying in transverse planes to the axis of the rolls, and flexible endless members trained around said adjustable rolls in said grooves for the purpose of forming longitudinal grooves in the egg case flats.

9. In a machine of the class described, the combination with a plurality of intermeshing corrugated rolls having peripheral grooves, of a plurality of endless bands trained around said rolls and running in certain of said grooves and loose rings mounted in other of said peripheral grooves.

10. In a machine of the class described, a pair of intermeshing rolls having aligned peripheral grooves, and endless bands trained around one of said corrugated rolls in the grooves thereof, and adapted to run in the grooves of said other corrugated roll.

11. In a machine of the class described, a stationary corrugated roll, a second adjustable corrugated roll adapted to be pressed into meshing relation therewith, each of said rolls having peripheral grooves, means for feeding sheet material to said rolls for corrugating the same, and endless stripping members trained in said grooves of said adjustable roll and adapted to press the sheet material into said grooves in said stationary roll and to hold said material there-against.

12. In a machine of the class described, a stationary corrugated roll, a second adjustable corrugated roll adapted to be pressed into meshing relation therewith, resilient means tending to separate said rolls, each of said rolls having peripheral grooves, means for feeding sheet material to said rolls for corrugating the same and means positioned in said grooves of said adjustable roll and adapted to press the sheet material into said grooves in said stationary roll and to hold said material thereagainst.

13. The combination with a pair of intermeshing corrugated rolls having alined peripheral grooves, of loose rings positioned within the grooves of one of said corrugated rolls and adapted to project into the corresponding grooves of said other roll.

14. In a machine of the class described, a pair of intermeshing corrugating rolls, having alined peripheral grooves, means for feeding a web of paper therebetween for corrugating the same, a smooth surfaced roll having similar alined grooves adapted to press against one of said corrugating rolls, and flexible means traveling in said alined grooves for forming longitudinal grooves in the web of paper.

15. In a machine of the class described, a pair of corrugating rolls for forming corrugations in a web of paper and a smooth surfaced roll adapted to partially crush the corrugations in said paper to render the same more resilient.

In testimony whereof I have hereunto subscribed my name at St. Paul, Ramsey County, Minnesota.

SWAN SMITH.